March 21, 1961 — C. R. STEBER — 2,975,916
ROLLER SUPPORT FOR BOAT TRAILER
Filed Oct. 28, 1957

Clarence R. Steber
INVENTOR.

United States Patent Office 2,975,916
Patented Mar. 21, 1961

2,975,916
ROLLER SUPPORT FOR BOAT TRAILER
Clarence R. Steber, Biloxi, Miss.
(3978 S. Byronell Drive, Mobile, Ala.)
Filed Oct. 28, 1957, Ser. No. 692,768
6 Claims. (Cl. 214—84)

This invention relates in general to new and useful improvements in boat trailers, and more specifically to an improved roller support for boat trailers.

In order that boats may be slid on and off of boat trailers, the average boat trailer is provided with a plurality of longitudinally spaced rollers. These rollers engage the bottom of the boat and serve as supports for the boat. However, when the boat is being transported on the trailer, the fact that the boat is seated on the rollers results in two disadvantages. One, the boat has a tendency to continuously shift with respect to the trailer due to the freedom of movement on the rollers. Secondly, the rollers only provide a small contact area for the bottom of the boat and do not properly support the boat.

It is therefore the primary object of this invention to provide a support for supporting a boat on a boat trailer, the support being so constructed whereby either a roller or a flat supporting surface may be selectively presented.

Another object of this invention is to provide an improved support for boat trailers, the support being of the type for supporting a boat on the boat trailer and including a roller and a flat supporting surface, the support being so constructed whereby once the boat is in position on the trailer, the support may be pivoted to lower the roller and permit the flat support surface to come into engagement with the bottom of the boat.

Another object of this invention is to provide an improved roller support for boat trailers, the roller support being of a construction whereby it may be readily mounted on either existing trailers or new trailer construction and which will properly support a boat either for movement along a boat trailer or for secure mounting of the boat trailer for transportation.

A further object of this invention is to provide an improved boat support for boat trailers, the boat support including both a roller and a flat supporting block, there being provided suitable latch means for retaining the roller in an uppermost position during the loading and unloading of a boat and the supporting block in the uppermost position during the transporting of a boat.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
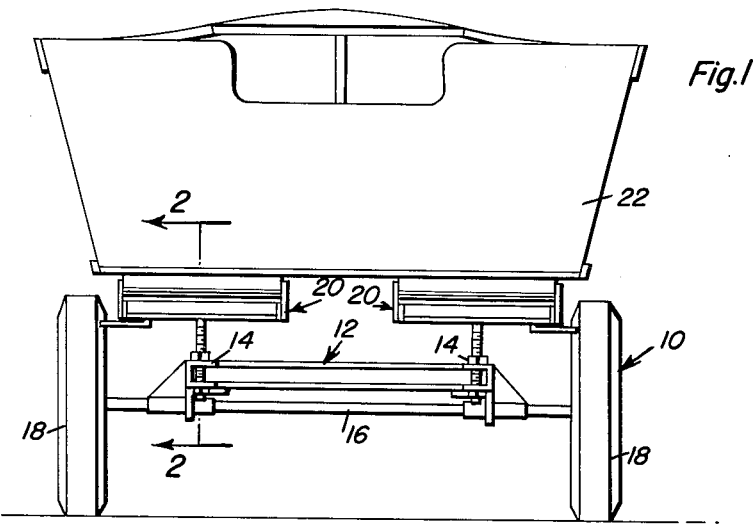
Figure 1 is a rear elevational view of a boat trailer and shows mounted thereon a boat, the boat being supported by the roller supports which are the subject of this invention.
Figure 2:
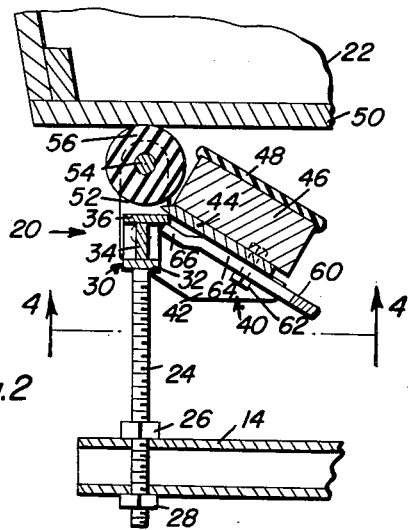
Figure 2 is an enlarged fragmentary sectional view taken substantially upon the plane indicated by the section line 2—2 of Figure 1 and shows the specific details of the boat support and the relationship thereof with respect to the boat, the roller of the boat support being engaged with the bottom of the boat.
Figure 3:
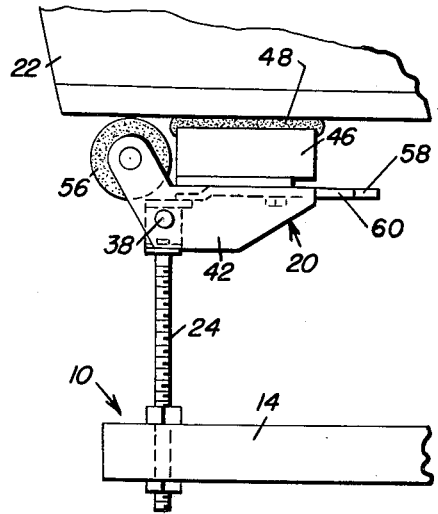
Figure 4:
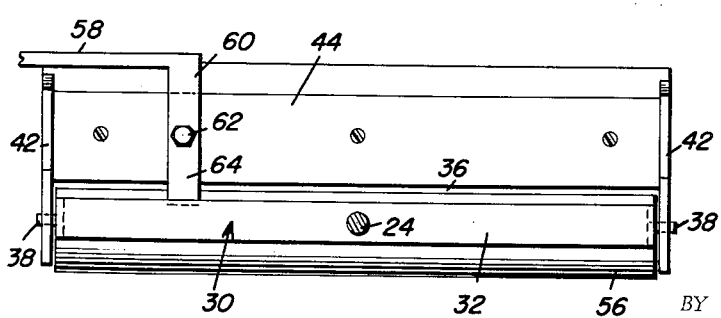

Figure 3 is an enlarged fragmentary side elevational view of the rear part of the boat trailer and boat and shows the boat support in a lowered position with the flat block engaging the underside of the boat; and Figure 4 is an enlarged fragmentary sectional view taken substantially upon the plane indicated by the section line 4—4 of Figure 2 and shows further the details of the latch means for securing the boat support with the roller disposed uppermost.

Referring now to the drawings in detail, it will be seen that there is illustrated a boat trailer which is referred to in general by the reference numeral 10. The boat trailer 10 may be of any construction and includes a frame 12 which among other frame members is formed of a pair of longitudinal frame rails 14. The frame 12 is supported by an axle 16 having wheels 18 on the oppoiste ends thereof. Carried by the frame 12 at longitudinally spaced intervals are boat supports which are referred to in general by the reference numeral 20. The boat supports 20 support a boat 22 for both movement along the boat trailer 10 and for transportation by the boat trailer 10.

As is best shown in Figures 2 and 3, the boat supports 20 each include a standard 24. The standard 24 is externally threaded and passes down through an associated one of the frame rails 14. The standard 14 is contained at the proper height by means of a pair of nuts 26 and 28 which clamp the upper and lowers sides, respectively, of the frame rail 14.

The upper end of the standard 24 is provided with a transversely extending support member 30. The support member 30 is generally H-shaped in cross-section and includes a lower flange 32, a vertical web 34 and an upper flange 36. The lower flange 30 has welded or otherwise secured thereto the upper end of the standard 24. Carried by opposite ends of the web 34 are pivot pins 38.

The boat support 20 also includes a support bracket which is referred to in general by the reference numeral 40. The support bracket 40 includes a pair of side plates 42 which are connected together by a transverse plate 44. The side plates 42 receive the pivot pins 38 and pivotally mount the support brackets 40 on the standard 24.

Overlying the transverse plate 44 and rigidly secured thereto is a flat block 46 having a cushioning member 48 secured to the upper side thereof. The cushioning member 48 will engage the bottom 50 of the boat 22 when the boat 22 is positioned on the trailer 10 for transportation, as is best shown in Figure 3.

The side plates 42 include upstanding ears 52 between which there extends a shaft 54. Carried by the shaft 54 is a roller 56.

It is to be noted that the roller 56 is disposed below the block 46 when the block 46 is engaged with the bottom of the boat 22. However, in order that the boat 22 may be freely moved along the trailer 10 for launching and for retrieving the boat 22, it is desired that the roller 56 be disposed uppermost, as is shown in Figure 2. This may be readily accomplished due to the fact that the support bracket 40 is pivotally carried by the standard 24.

In order to facilitate the pivoting of the support bracket 40, there is secured to the underside of the transverse plate 44 a handle 58 which includes an offset portion 60. The offset portion 60 is pivotally connected to the underside of the plate 44 by means of a pivot pin 62 in the form of a conventional fastener. By pushing down on the handle 58, the roller 56 may be swung to its uppermost position of Figure 2. It is to be also noted that the offset portion 60 has an extension 64 which terminates in a vertically offset portion 66 for engagement beneath the upper flange 36 when the roller 56 is disposed uppermost. This is best illustrated in Figure 2.

Inasmuch as the axis of the shaft 54 is disposed vertically above the axes of the pivot pins 38 when the roller 56 is disposed uppermost, the weight of the boat 22 does not have a tendency to attempt to pivot the roller 56 to a lower position. It is therefore necessary only to prevent swinging movement of the roller 56 due to the movement of the boat 22 over the roller 56. This is accomplished by clamping an edge of the flange 36 between the transverse plate 44 and the extension 64, as shown in Figure 2.

Once the boat 22 has been moved into position on the trailer 10, it is lowered onto the supporting blocks 46 by first swinging the extension 64 out of engagement with the upper flange 36 and then by releasing the handle 58. The weight of the boat 22 together with a slight upward movement on the handle 58 will result in the support bracket 40 pivoting from the position of Figure 2 to the position of Figure 3. When in the position of Figure 3, the boat 22 is ready for travel and the handle 58 may then be manipulated to position the offset portion 66 above the upper flange 36 as shown in Figure 3 to retain the support bracket 40 in a pivoted position with the block 46 uppermost and supporting the boat 22.

When it is desired to launch the boat 22, it is necessary that the handle 58 be depressed. Once the handle 58 has been depressed so that the roller 56 resumes its position of Figure 2 by elevating the boat 22 slightly, the roller 56 is again retained in its uppermost position by swinging the handle 58 forwardly so as to move the extension 64 in its locking position relative to the flange 36.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A support assembly for boat trailers adapted to support the lower surfaces of a boat, said support assembly comprising a standard adapted to be secured to a boat trailer, a support bracket, means pivotally mounting said bracket to said standard for pivotal movement about a substantially horizontally disposed axis, a flat boat support carried by said support bracket and a roller boat support carried by said support bracket in spaced relation to each other and being movable, upon rotation of said support bracket, to be selectively positioned uppermost relative to the other for comprising the sole support of a boat surface disposed thereabove, and latch means carried by said bracket and engageable with said support standard for retaining said bracket in selected pivoted positions.

2. The combination of claim 1 including control means connected to said support bracket for pivoting said support bracket to selectively position said flat boat support and said roller boat support uppermost in a boat supporting position, said latch means being connected to and actuated by said control means.

3. The combination of claim 2 wherein said roller boat support is disposed vertically relative to said horizontally disposed axis when the roller boat support is disposed in the uppermost position.

4. In combination, a boat trailer, a support assembly secured to said boat trailer for supporting the lower surfaces of a boat disposed on said trailer, said support assembly comprising a standard, a support bracket, means pivotally mounting said bracket to said standard for pivotal movement about a substantially horizontally disposed axis, a flat boat support, and a roller boat support carried by said support bracket in spaced relation to each other and being movable, upon rotation of said support bracket, to be selectively positioned uppermost relative to the other for comprising the sole support of a boat surface disposed thereabove, and latch means carried by said bracket and engageable with said support standard for retaining said bracket in selected pivoted positions.

5. The combination of claim 4 including control means connected to said support bracket for pivoting said support bracket to selectively position said flat boat support and said roller boat support uppermost in a boat supporting position, said latch means being connected to and actuated by said control means.

6. In combination, a boat trailer, a support assembly secured to said boat trailer for supporting the lower surfaces of a boat disposed on said trailer, said support assembly comprising a standard, a support bracket, means pivotally mounting said bracket to said standard for pivotal movement about a substantially horizontally disposed axis, a flat boat support and a roller boat support carried by said support bracket in spaced relation to each other and being movable, upon rotation of said support bracket, to be selectively positioned uppermost relative to the other for comprising a sole support of a boat surface disposed thereabove, said roller boat support being disposed vertically relative to said horizontally disposed axis when the roller boat support is disposed in the uppermost position, and latch means carried by said bracket and engageable with said support standard for retaining said bracket in position with said flat boat support disposed in the uppermost position.

References Cited in the file of this patent

UNITED STATES PATENTS

| 782,909 | Jefferis | Feb. 21, 1905 |
| 2,360,133 | Houssiere | Oct. 10, 1944 |
| 2,788,146 | Gronlund | Apr. 9, 1957 |